(12) United States Patent
Lim et al.

(10) Patent No.: US 9,431,651 B2
(45) Date of Patent: Aug. 30, 2016

(54) COMPOSITE MATERIAL FOR A LITHIUM ION BATTERY ANODE AND A METHOD OF PRODUCING THE SAME

(71) Applicant: Hong Kong Applied Science and Technology Research Institute Co. Ltd., New Territories (HK)

(72) Inventors: Pau Yee Lim, Ma On Shan (HK); Yingkai Jiang, Shenzhen (CN); Man On Fu, Lam Tin (HK); Tak Cheung Yau, Kowloon (HK)

(73) Assignee: Hong Kong Applied Science And Technology Research Institute Company Limited, Hong Kong (CN)

( * ) Notice: Subject to any disclaimer, the term of this patent is extended or adjusted under 35 U.S.C. 154(b) by 334 days.

(21) Appl. No.: 14/014,410

(22) Filed: Aug. 30, 2013

(65) Prior Publication Data

US 2015/0064564 A1 Mar. 5, 2015

(51) Int. Cl.
| | |
|---|---|
| H01M 4/36 | (2006.01) |
| H01M 4/04 | (2006.01) |
| H01M 4/1395 | (2010.01) |
| C01G 19/00 | (2006.01) |
| H01M 4/1397 | (2010.01) |
| H01M 4/58 | (2010.01) |
| H01M 4/587 | (2010.01) |
| H01M 4/62 | (2006.01) |
| H01M 4/38 | (2006.01) |
| C01G 19/02 | (2006.01) |
| H01M 4/48 | (2010.01) |
| H01M 10/052 | (2010.01) |

(52) U.S. Cl.
CPC .............. *H01M 4/366* (2013.01); *C01G 19/00* (2013.01); *C01G 19/02* (2013.01); *H01M 4/0497* (2013.01); *H01M 4/1395* (2013.01); *H01M 4/1397* (2013.01); *H01M 4/387* (2013.01); *H01M 4/587* (2013.01); *H01M 4/5825* (2013.01); *H01M 4/625* (2013.01); *C01P 2004/03* (2013.01); *H01M 4/049* (2013.01); *H01M 4/48* (2013.01); *H01M 10/052* (2013.01); *Y02E 60/122* (2013.01); *Y02P 70/54* (2015.11); *Y10T 29/49115* (2015.01)

(58) Field of Classification Search
None
See application file for complete search history.

(56) References Cited

U.S. PATENT DOCUMENTS

| | | | |
|---|---|---|---|
| 7,776,234 B2 | 8/2010 | Gauthier et al. | |
| 8,263,265 B2 | 9/2012 | Mah | |
| 2009/0053607 A1* | 2/2009 | Jeong | H01M 4/0404 429/231.95 |

(Continued)

FOREIGN PATENT DOCUMENTS

| | | |
|---|---|---|
| CN | 1317841 A | 10/2001 |
| CN | 101868873 A | 10/2010 |

(Continued)

*Primary Examiner* — Sarah A Slifka
(74) *Attorney, Agent, or Firm* — Eagle IP Limited; Jacqueline C. Lui (57) ABSTRACT

A composite material for a lithium ion battery anode and a method of producing the same is disclosed, wherein the composite material comprises a porous electrode composite material. Pores with carbon-based material forming at the pore wall are created in situ. The porous electrode composite material provide space to accommodate volumetric changes during battery charging and discharging while the carbon-based material improved the conductivity of the electrode composite material. The method creates pores to have a denser carbon content inside the pores and a wider mouth of the pores to enhance lithium ion distribution.

11 Claims, 13 Drawing Sheets

(56) References Cited

U.S. PATENT DOCUMENTS

| | | |
|---|---|---|
| 2009/0191458 A1 | 7/2009 | Herle |
| 2010/0051856 A1 | 3/2010 | Kim et al. |
| 2010/0310939 A1 | 12/2010 | Yoshida |
| 2011/0037030 A1 | 2/2011 | Holzapfel et al. |
| 2011/0091772 A1 | 4/2011 | Mishima et al. |
| 2012/0321959 A1 | 12/2012 | Yushin et al. |

FOREIGN PATENT DOCUMENTS

| | | |
|---|---|---|
| CN | 102439771 | 5/2012 |
| JP | 2010-67509 A | 10/2011 |

* cited by examiner

COMPOSITE MATERIAL FOR A LITHIUM ION BATTERY ANODE AND A METHOD OF PRODUCING THE SAME

FIELD OF INVENTION

This invention relates to the field of composite material for a battery electrode and, in particular, for lithium ion battery.

BACKGROUND OF INVENTION

Lithium ion batteries are able to store more energy than conventional batteries and are used in many portable appliances. When a lithium ion battery is being charged, lithium ions travel from the cathode to the anode. Electrons supplied at the anode reduces the lithium ions and the anode holds on to the resultant lithium, thereby storing electrical energy. When the battery is in use, the lithium discharges held electrons and lithium ions returns from the anode to the cathode.

The typical lithium battery has a graphite anode, which has a known structure comprising parallel planes of carbon between which lithium ions may enter and be stored as lithium. Such graphite anode has a specific capacity of 372 mAh/g (milli ampere×hour/gram) which is becoming hardly enough for modern day mobile gadgets. Other materials which can hold more lithium and increase the amount of energy packed into an anode has been proposed, such as aluminium, silicon and so on. However, these materials comes with different problems. For example, silicon and tin are quite unstable as anode material because of volumetric expansion, which eventually cut short the life of the battery.

It has been proposed to replace graphite in the anode with tin. Tin works in a similar way as graphite, which is to provide a structure into which the lithium can be inserted, except that it has a higher theoretical capacity of 990 mAh/g. However, tin also has a high volume expansion coefficient. A tin structure expands and contracts during lithium alloying and dealloying to the tin, and this could easily break down the structure leading to capacitance decay inside the anode.

Further proposals have been made to use tin-based material which has less volumetric expansion instead of tin. However, those tin-based materials have inferior electro-conductivity and compatibility to battery electrolyte.

Therefore, it is desirable to propose methods and apparatus with features that could mitigate these problems.

SUMMARY OF INVENTION

Accordingly, the present invention in one aspect is a composite material suitable for use in a lithium ion battery anode comprising an electro-conductive material having pores; and a more electro-conductive material on the walls of the pores. This provides the benefits of a first material having structural characteristics desirable for containing more battery electrolytes such as lithium ions, to be used in conjunction with second material having greater electro-conductivity than the first material.

Preferably, the material is a tin-based amorphous material, such as one having an Sn—P—O matrix generally, and which may comprise various compositions of tin phosphate, tin (II) based material or tin (IV) based material and so on.

Furthermore, second material having greater electro-conductivity is preferably a carbonaceous material, such as a layer of carbon or carbon structure.

Preferably, there is a higher amount of the more electro-conductive material inside the pores than at, around or about the mouths of the pores. For example, the carbonaceous material is thicker or denser within the pores than at the mouth of the pores. This gives the advantage that lithium ions in the lithium ion battery may be drawn deeper into the pores rather than accumulate at the mouth of the pores. This reduces clogging caused by lithium itself and maximises the capacity of the electro-conductive material to contain lithium.

Furthermore, it is preferable that the more electro-conductive material makes up between 5-20 wt % of the composite material.

Typically, the electro-conductive material contains tin at >=30%, phosphorus between 5-30 wt %; and any amount of oxygen. However, it is possible that the electro-conductive material contains tin between 20-75 wt %; phosphorus between 5-30 wt %; and any remainder amount of oxygen.

In a second aspect, the invention proposes a method for producing a composite material for a lithium ion battery anode comprising the steps of: providing a conductive material having pores, the pores containing a decomposable substance; decomposing the decomposable substance to form on the walls of the pores a more electro-conductive material. Therefore, the invention provides the possibility of the decomposable substance being decomposed in situ, inside the pores, to form a more conductive material on the walls of the pores. An in situ coating by decomposition allows the walls of small pores to be coated readily while ensuring porosity remains in the conductive material.

Preferably, the decomposable substance is a carbon-based material that may be carbonised or broken down into carbon or short carbon chain layers that has greater electro-conductivity than the tin-based material.

Typically, the method comprises a step of carbonizing the carbon-based material in an inert gas atmosphere. The inert gas atmosphere prevents oxidation of the carbonaceous material into carbon dioxide or carbon monoxide which escapes as gas. In a variation of this step, however, a trace amount of oxygen is introduced into the generally inert atmosphere. The amount of oxygen is provided to only allow opportunistic oxidation of carbon at the mouths of the pores, such that the mouths of the pores has less carbonaceous material than inside the pores. Preferably, oxygen is introduced into the inert gas atmosphere only after it is deemed that the carbon-based material has sufficiently carbonised.

Alternatively, the method comprises a step of carbonising the carbon-based material in a reducing atmosphere in order to reduce any presence of tin(IV) to tin(II). Tin(II) requires less accompanying presence of anions such as oxide or phosphate. When lithium is attached to an anion, the lithium becomes inseparable from the anion. Reducing tin(IV) to tin(II) minimises the chances of lithium ions from the cathode binding permanently to any anion, which in turn provides the possibility of higher capacity in a battery. Alternatively, the composite material is subjected to being heated in a reducing atmosphere in any earlier or later step separated from that step of decomposing the decomposable substance.

Optionally, the electrode material is a tin-based material and the method comprises earlier steps of: precipitating fine particles of the tin-based material in the presence of a surfactant; adding a coagulant to coagulate the precipitate and the surfactant to form a deposit of tin-based material mixed with the surfactant and coagulant, the coagulant being the carbon-based material; removing the surfactant from the coagulated precipitate to form pores in the tin-based material. Removal of the surfactant is preferably achieved by heating, evaporating or decomposing the surfactant. Any carbon substance on surface at this stage is typically removed along with the surfactant by heating in air. Preferably, the surfactant and coagulant in the coagulated precipitate are decomposable at different temperature ranges.

Preferably, the surfactant is an anionic surfactant and the coagulant is cationic. Also preferably, the coagulant is a carbon-based material which is a relatively long chain cationic polymer, such as a long chain hydrocarbon.

Preferably, the anion surfactant is polymeric sulfonates or polycarboxylare, and the coagulant is anyone of polyamine, polyamide, polyether, polyethylene, polyethylenimine or polyaziridine.

In some embodiments, the surfactant is attached to a volatile group, such as methanal, an example of which is formaldehyde. The volatile group imparts certain volatility to the surfactant. Having certain volatility provides mobility to the surfactant to migrate inside the tin-based material when heated, eventually to vapourise away.

In a third aspect, the invention proposes a method for producing a porous tin-based material comprising the steps of: precipitating particles of a tin-based material in the presence of a surfactant to form micelles of the tin-based material surrounded by the surfactant; adding a coagulant to form a deposit of the micelles and coagulant; heating the deposit to move the surfactant through the deposit; the surfactant and the coagulant having a mutual attraction such that the coagulant moves together with the surfactant through the deposit; the movement of the surfactant breaking the micelles and allowing the particles of the tin-based material to contact mutually; evaporating the surfactant from the deposit to form pores in the tin-based material; wherein the coagulant are left in the pores when the surfactant evaporates away.

This method allows coagulant to be form in situ in the pores of the tin-based material. Accordingly, even very fine pores can be filled with the coagulant as the pores are formed, and the walls of the pores can be laid or coated easily with a carbonaceous material when the coagulant is broken down or carbonises.

BRIEF DESCRIPTION OF FIGURES

A embodiment of the invention will now be described with reference to the following drawings in which like integer indicate like parts, wherein.

DETAILED DESCRIPTION OF THE PREFERRED EMBODIMENTS

Figure 1:
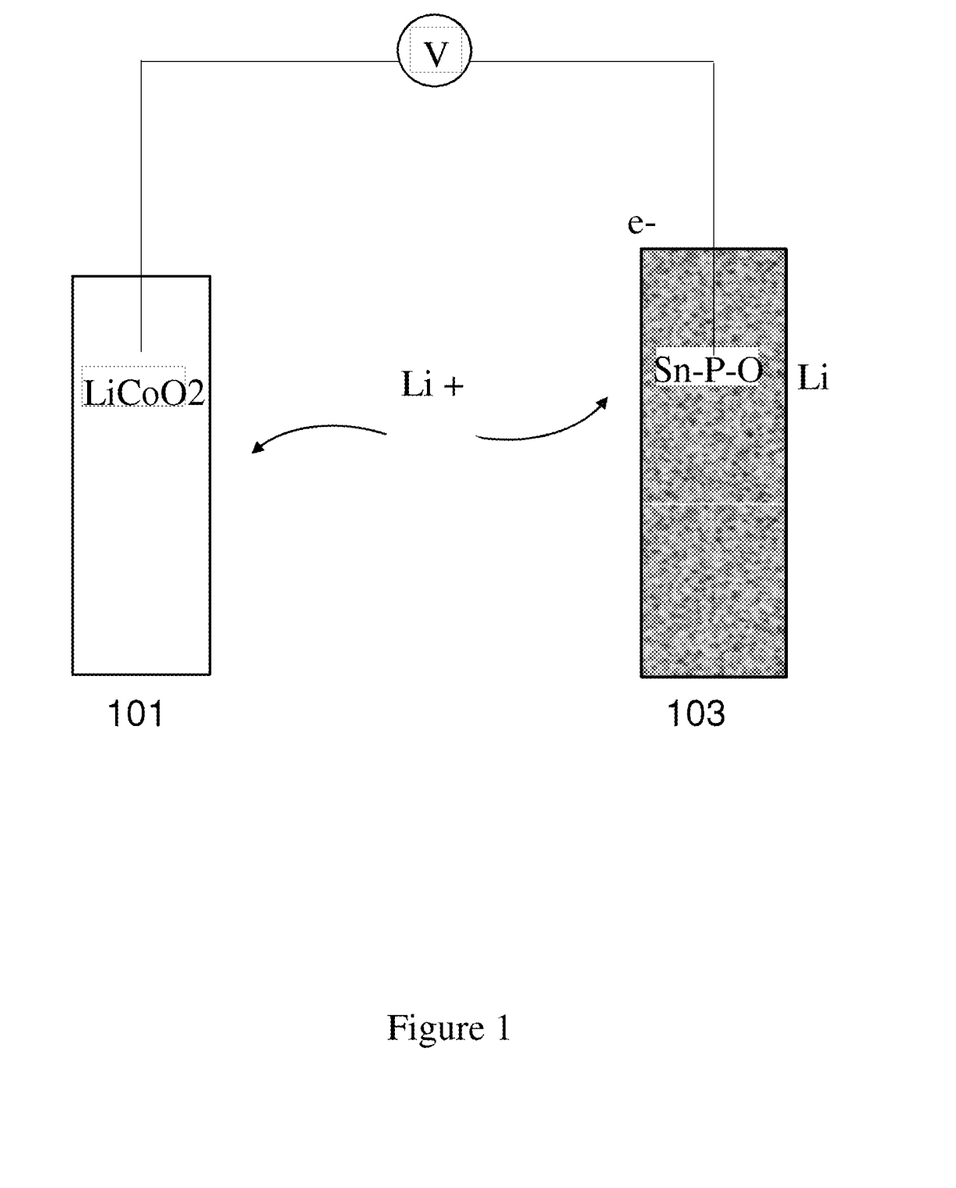
FIG. 1 is a schematic diagram of a lithium battery.

FIG. 1 is a schematic diagram of a lithium battery. The lithium battery has an anode 103 and a cathode 101, and contains a stock of electrolyte.

The anode material is made of a tin-based porous material of a general composition of Sn—P—O having tiny pores, the inner surfaces or walls of the pores are laid with carbon or a carbonaceous material capable of electro-conductivity.

For facilitating description herein, the tin-based porous material without the layer of carbon is termed tin based material, while the same material having a layer of carbon or carbonaceous material on the pore walls is termed an electrode composite material.

The cathode is generally a material comprising lithium, such as lithuim cobalt oxide, lithium iron phosphate or some other electrochemically reversible lithium salts.

The electrolyte is typically a mixture of organic carbonates such as ethylene carbonate as solvent and lithium hexfluorophosphate as solute.

During battery discharge, positive lithium ion is extracted from the anode 103 and inserted into the cathode 101 with the simultaneous release of electron. If the cathode 101 is lithium cobalt oxide, the cathode 101 releases electrons as shown in the half-reaction:

$$LiCoO_2 \leftrightarrows Li_{1-n}CoO_2 + nLi^+ + ne^- \qquad (1)$$

Therefore, cobalt (Co) is oxidised from $Co^{3+}$ to $Co^{4+}$ during charging. The reverse occurs during discharging to reduce $Co^{4+}$ to $Co^{3+}$.

The corresponding anode half-reaction is:

$$nLi^+ + ne^- + Sn—P—O \leftrightarrows Li_nSn—P—O \qquad (2)$$

During battery charging, supply of electric current to the anode 103 converts lithium ion into lithium, which then 'alloys' into the tin-based anode 103. Conversely, the lithium 'dealloys' from the tin-based anode 103 during the discharging process.

Figure 2:
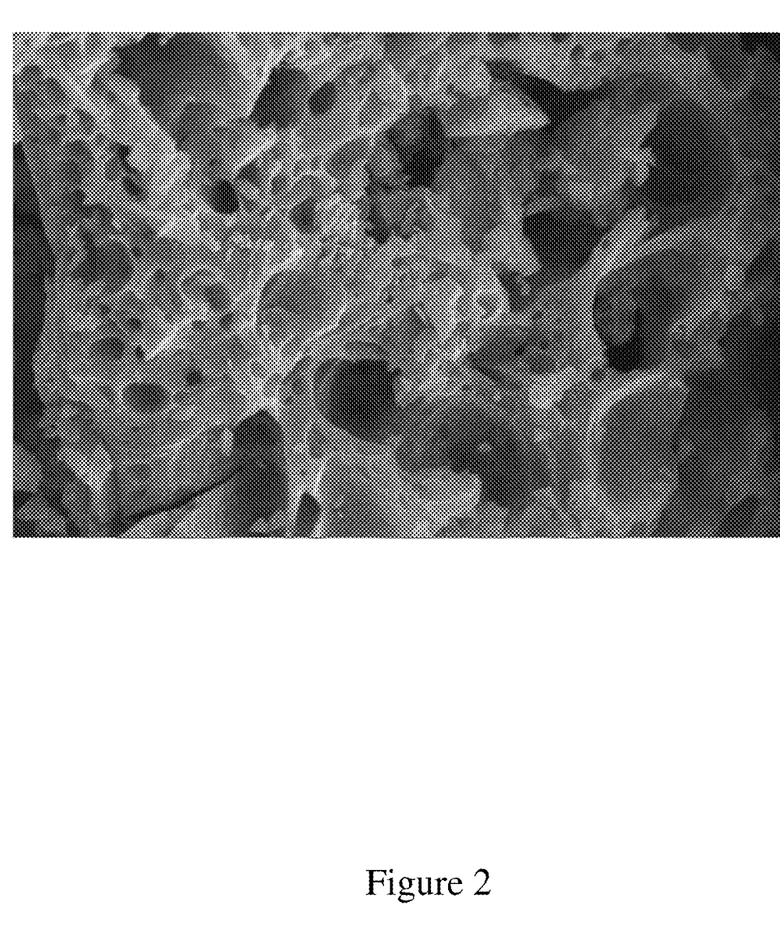
FIG. 2 is an electron microscope picture of an electrode composite material for an anode of the lithium ion battery of FIG. 1.

FIG. 2 is an electron microscope picture of the tin-based material having a porous structure comprising tiny pores of different sizes. The tin in the tin-based material provides the electroactive element for attracting lithium insertion into the porous material, while phosphorus and oxygen forming part of the tin-based material has a function of spacing out and dispersing the tin. This also spaces out the attracted lithium ions. The dispersed tin provides spatial allowance for accommodating volume expansion of the anode during battery charging. Therefore, the tiny pores provide a large surface area in the tin-based material for interacting with lithium ions.

Figure 3:
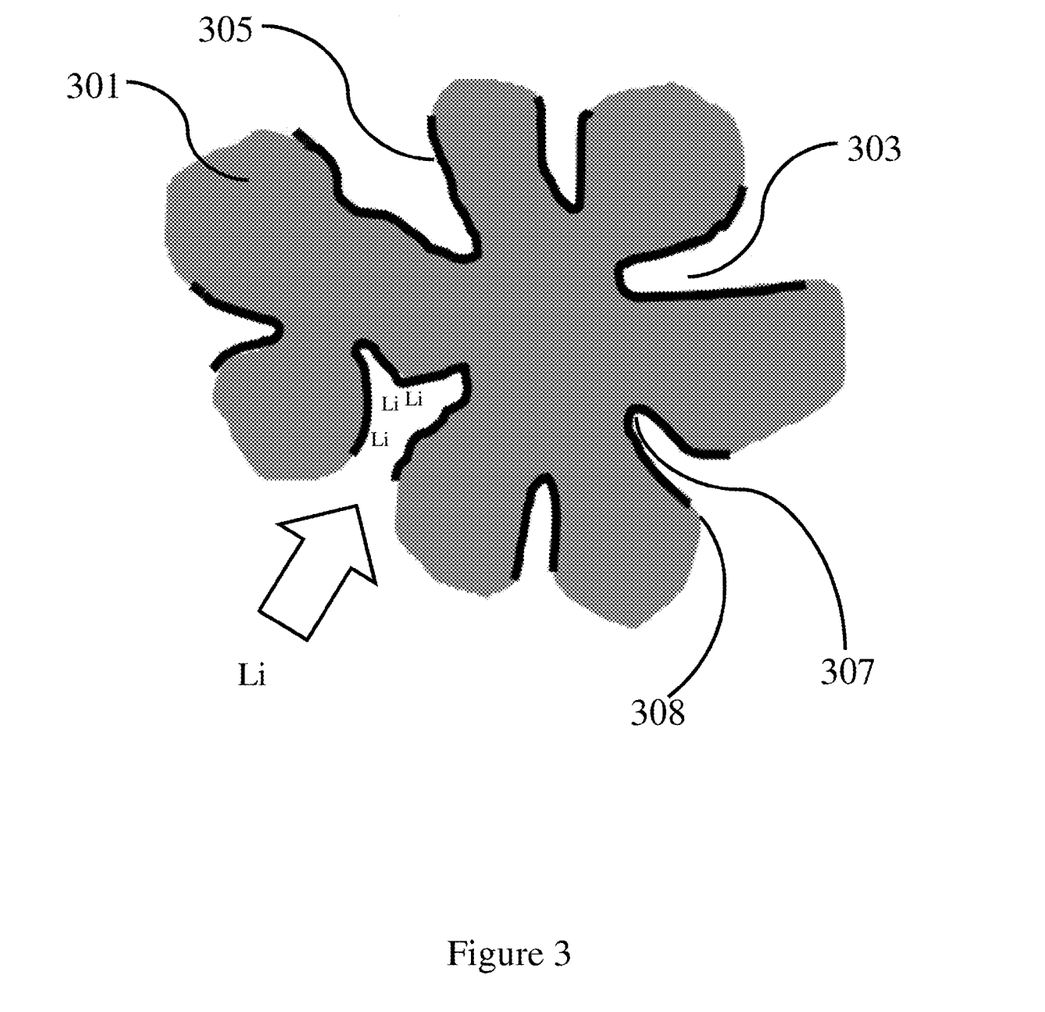
FIG. 3 illustrates the electrode composite material of FIG. 2 schematically.

FIG. 3 shows the surfaces or walls inside the pores 303 in the tin-based material 301 deposited with or coated with a carbonaceous material 305 such as a carbon layer to form an electrode composite material useable as battery anode. The carbonaceous layer 305 has better conductivity than tin-based material 301 and is able to attract lithium ions into the pore more strongly. Treating the walls inside the pores 303 in this way provides the anode with both the structural benefits of tin-based material 301 for storing lithium and the electro-conductivity of the carbonaceous material 305 for attracting lithium ions.

Therefore, during lithium ion battery charging, lithium ions are attracted to migrate into the pores, and diffused through the layer of carbonaceous material 305 to contact the tin-based material, where the lithium ions are reduced and alloyed with tin in the tin-based material as a form of reversible lithium-tin alloy.

Accordingly, the anode is made of a porous material providing structural support for a more electro-conductive material laid on the surfaces or walls of the pores 303.

Figure 4:
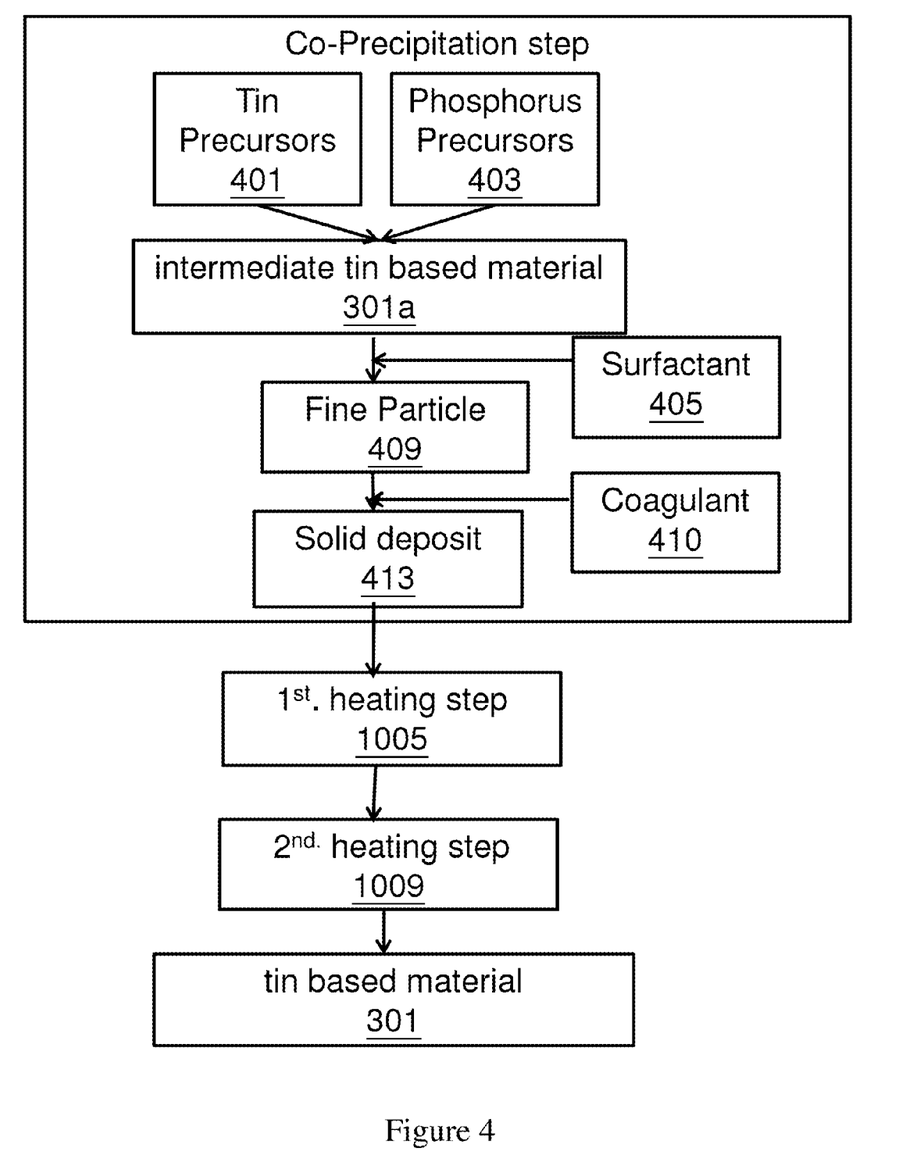
FIG. 4 illustrates a process for producing the electrode composite material of FIG. 2 and FIG. 3.

FIG. 4 illustrates steps in a process to produce the anode material. Accompanying FIGS. 5a to 9 each illustrate a specific step in the process of FIG. 4.

A solution of tin precursor 401 such as tin sulphate and a solution of phosphorous precursor 403 such as phosphorus acid are mixed to produce an intermediate tin-based material 301a by precipitation. The reaction is generally not stoichiometric, as the intermediate tin-based material 301a produced is not crystalline but has varying combinations of tin and phosphorous, oxide, hydroxide in an amorphous compound or mixture. Various forms of tin may also form part of the intermediate tin-based material 301a, including tin (II) and tin (IV).

Figure 5A:
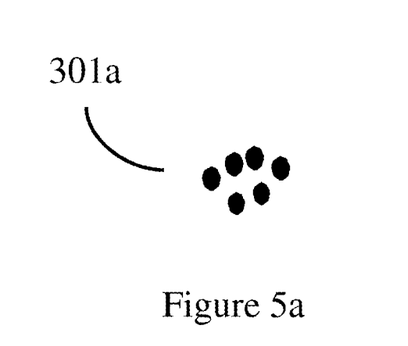
FIGS. 5a, 5b, 5c, 6a, 6b, 7, 8 and 9 each illustrates a specific step in the process of FIG. 4.
Figure 5B:
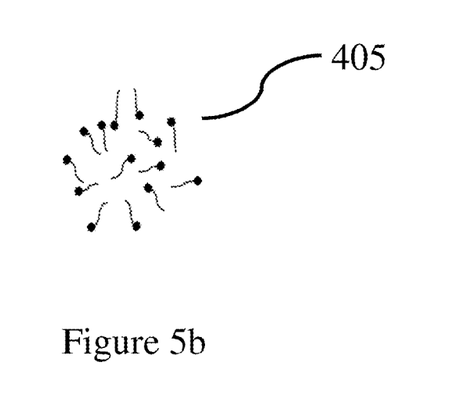
Figure 5C:
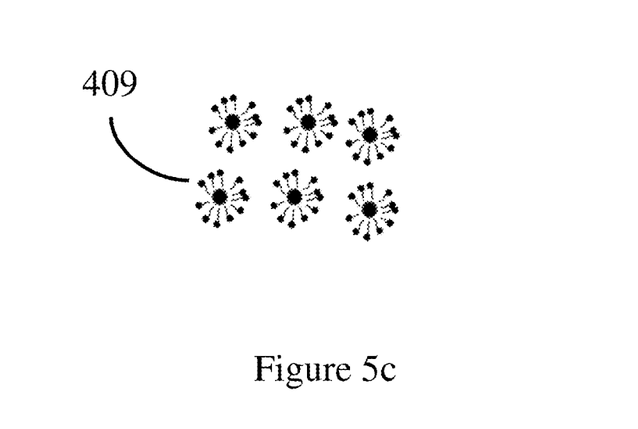

FIGS. 5a to 5c show that the precipitation takes place in the presence of a surfactant 405, the molecules of which immediately surrounding fine particles of the intermediate tin-based material 301a as soon as the particles precipitate to form micelles 409. In this way, the surfactant 405 provides a suspension of fine particles; the micelles prevent particles of the tin-based material 301 from agglomerating into large, coarse particle clusters.

Figure 6A:
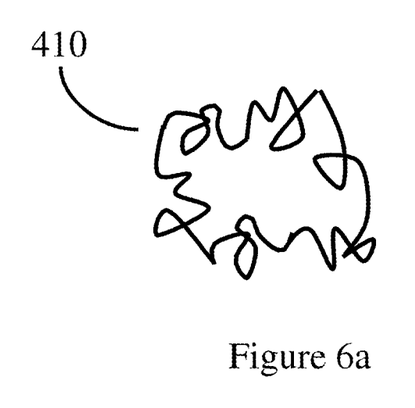
Figure 6B:
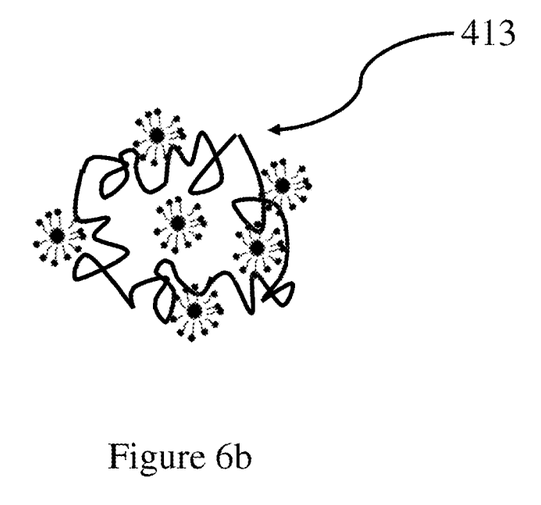

A coagulant 410 is then introduced into the suspension with stirring. Typically, the coagulant 410 is a long chain molecule having a relatively high molecular weight and which is attracted to the surfactant 405. FIGS. 6a and 6b show how the coagulant 410 molecule wraps around the micelles 409.

Figure 7:
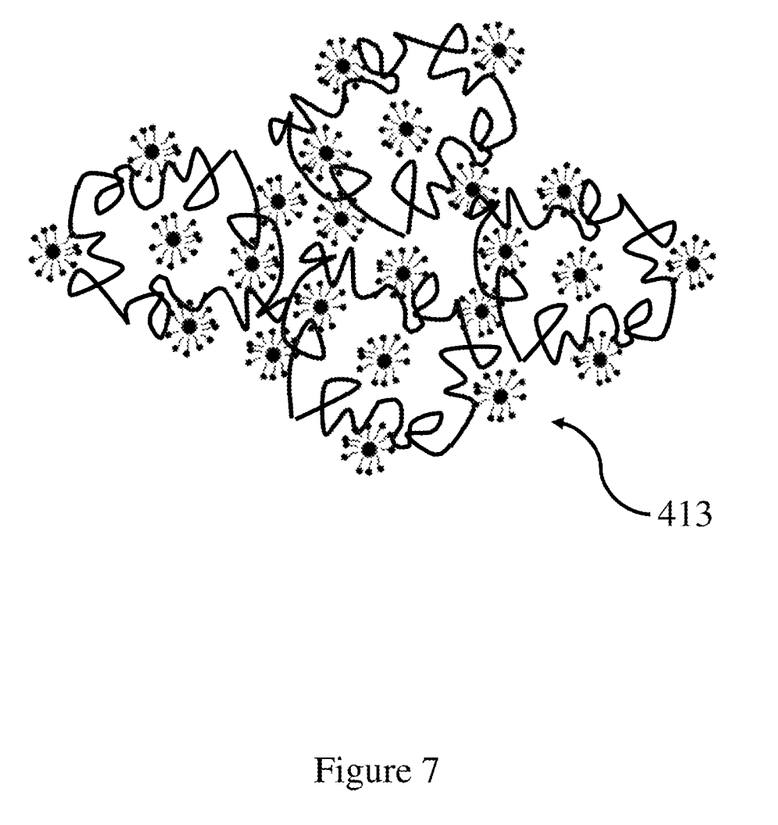

FIG. 4 and FIG. 7 show how the high molecular weight of coagulant causes the mixture of coagulant, surfactant and particles of tin-based material to settle together in a mixture, as a solid deposit 413. The solid deposit 413 is then recovered by filtration, washed with distilled water, and dried. Washing remove unreacted phosphorous acid and any soluble salts. The dried solid deposit 413 is then subjected to heat treatment.

The surfactant 405 is sufficiently volatile such that, when heated in a first heating stage, the surfactant 405 migrates through the dried solid deposit 413, from within the solid deposit 413 towards the surface of the solid deposit 413. The surfactant either has sufficient volatility inherently or the surfactant 405 comes attached with a methanal group such as formaldehyde which imparts volatility to the surfactant 405.

In this first heating stage, the temperature is typically >=300° C. applied for >=30 minutes in an atmosphere of air. In large scale production, time required for the surfactant 405 to be completely removed depends on specific conditions as the skilled man will know. During the heating, carbon substance on surface may be removed by oxidised as gases when exposed to oxygen in the air atmosphere.

Figure 8:
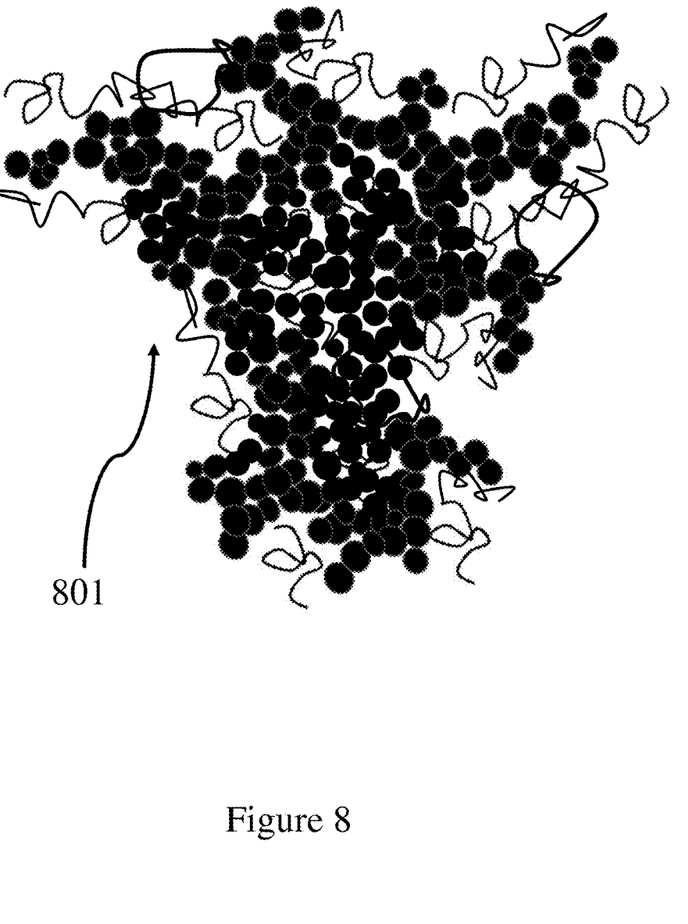
Figure 11:
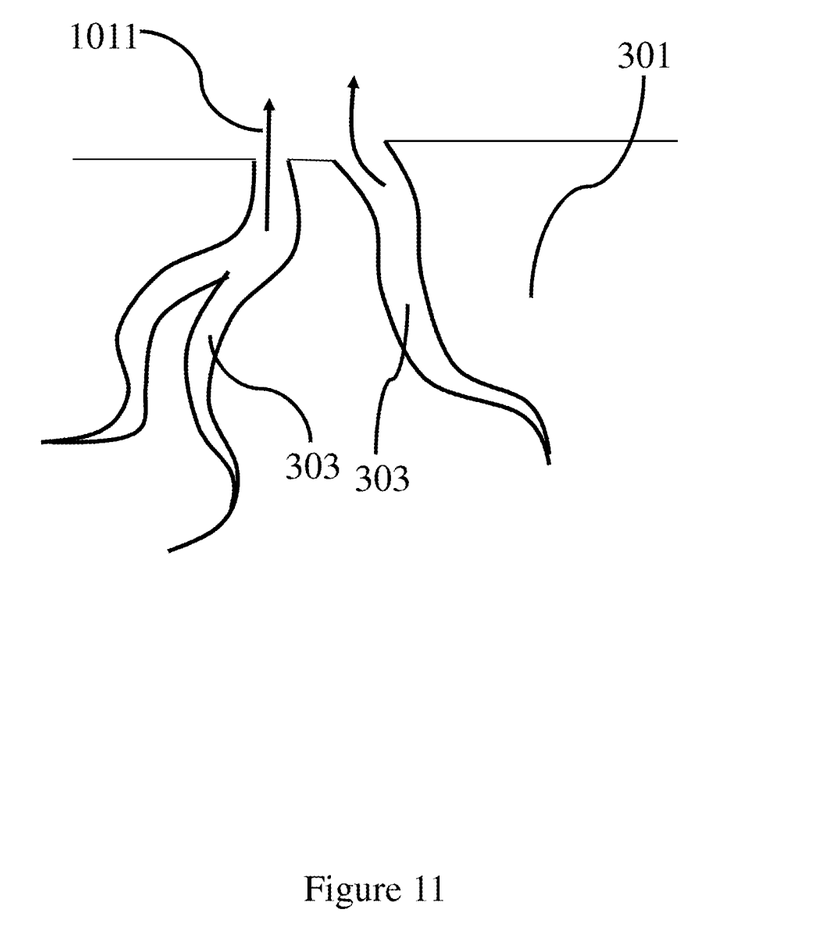
FIG. 11 illustrates the formation of pores in the electrode composite material of FIG. 3.

FIG. 11 illustrates how the surfactant leaves 1101 the solid deposit 413. As the surfactant 405 moves to the surface of the solid deposit 413, the attraction between the anionic surfactant 405 and the cationic coagulant 410 moves the coagulant 410 along, towards the surface of the solid deposit 413. Fine particles of tin-based material 301 in the solid deposit 413 now left behind by the surfactant 405 are no longer enclosed in a micelle structure, and are then able to contact mutually and agglomerate into a somewhat unitary mass. Nearer the surface of the solid deposit 413, some of the fissures meet and merge to form larger fissures. Eventually, the agglomerated solid deposit 413 has fissures resulting from the migration paths of the surfactant 405 and the coagulant 410, which provide the pores in the tin-based material 801. FIG. 8 illustrates the so-produced porous tin-based material 801.

On reaching the surface of the solid deposit 413, the surfactant 405 is either capable of evaporating into the surrounding atmosphere directly or is capable of breaking down into more volatile compounds or form gases in order to escape. If surfactant 405 should be oxidised into gases in order to be released, the atmosphere would be typically air.

The coagulant 410 which moved together with the surfactant 405 towards the surface of the solid deposit 413 is not released into the atmosphere along with the relatively volatile surfactant 405. This is due to the stronger binding force within the coagulant 410. The pores 303 formed by the release of the surfactant 405 are therefore filled with the coagulant 410.

Figure 9:
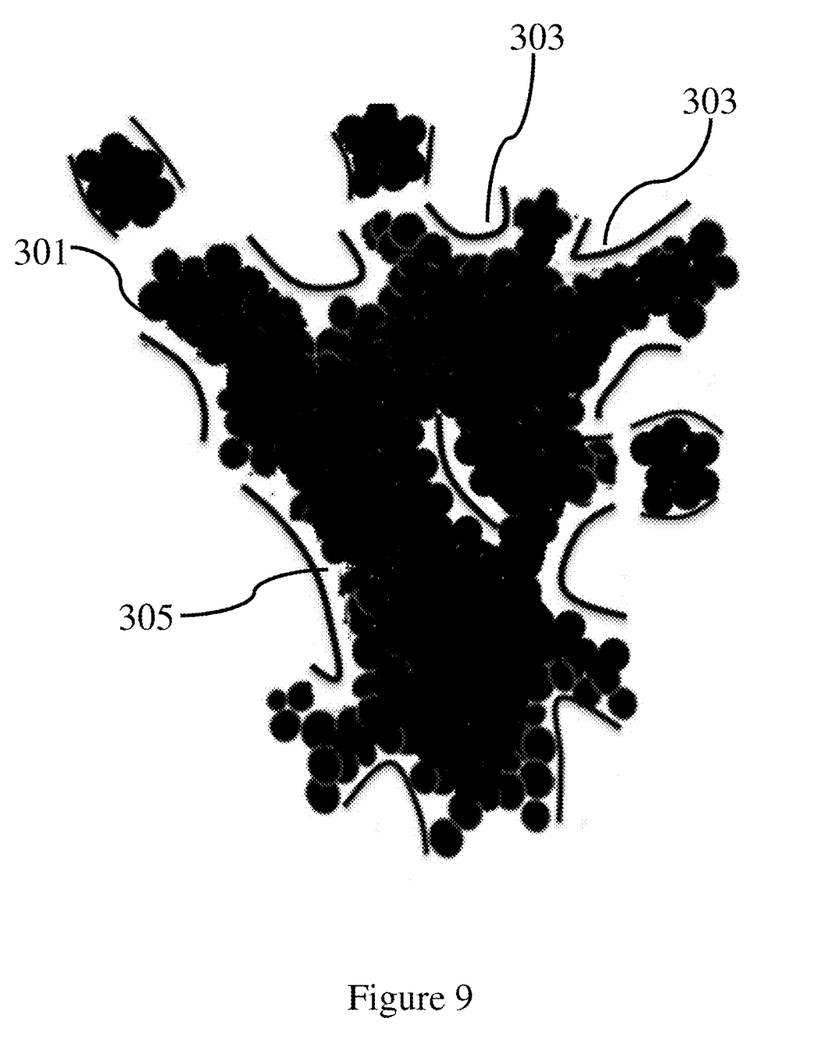

The porous tin-based material 801 is then placed in an atmosphere of inert gas, such as argon or nitrogen, and subjected to a second heating stage 1009 at a higher temperature. In practice, the heat may cause the coagulant 410 to move a little and be physically redistributed somewhat near the surface inside pores 303 without being vapourised away. The heat decomposes or carbonizes the coagulant 410 in situ to form a carbonaceous material 305 on the walls of the pores 303, as illustrated in FIG. 9 which corresponds to FIG. 3. Carbonising the coagulant in situ, i.e. within the pores, allows for the walls of even tiny pores, fissure or cavities to be laid with a carbonaceous material 305.

The coagulant 410 can be any long chain molecule which is able to bind to the surfactant 405 surrounding the tin-based material 301, and can decompose to form an electro-conductive layer on the walls of the pores. In this embodiment, the long chain molecule is preferably a carbon based molecule, such as a hydrocarbon polymer.

The temperature for carbonization of the coagulant 410 is not a specific or constant temperature because the coagulant 410 comprises molecules of varying chain lengths, leading to a range of temperatures over which heating, melting and carbonation may occur. Generally, the average temperature and duration, however, is preferably ≥500° C. for ≥2 hours.

Depending on the choice of surfactant 405 and coagulant 410, the temperature causing the surfactant 405 to migrate and vaporise away in the first heating stage should preferably be insufficient to carbonise or decompose the coagulant 410, in order for the different processes to be capable of being controlled separately.

Figure 10:
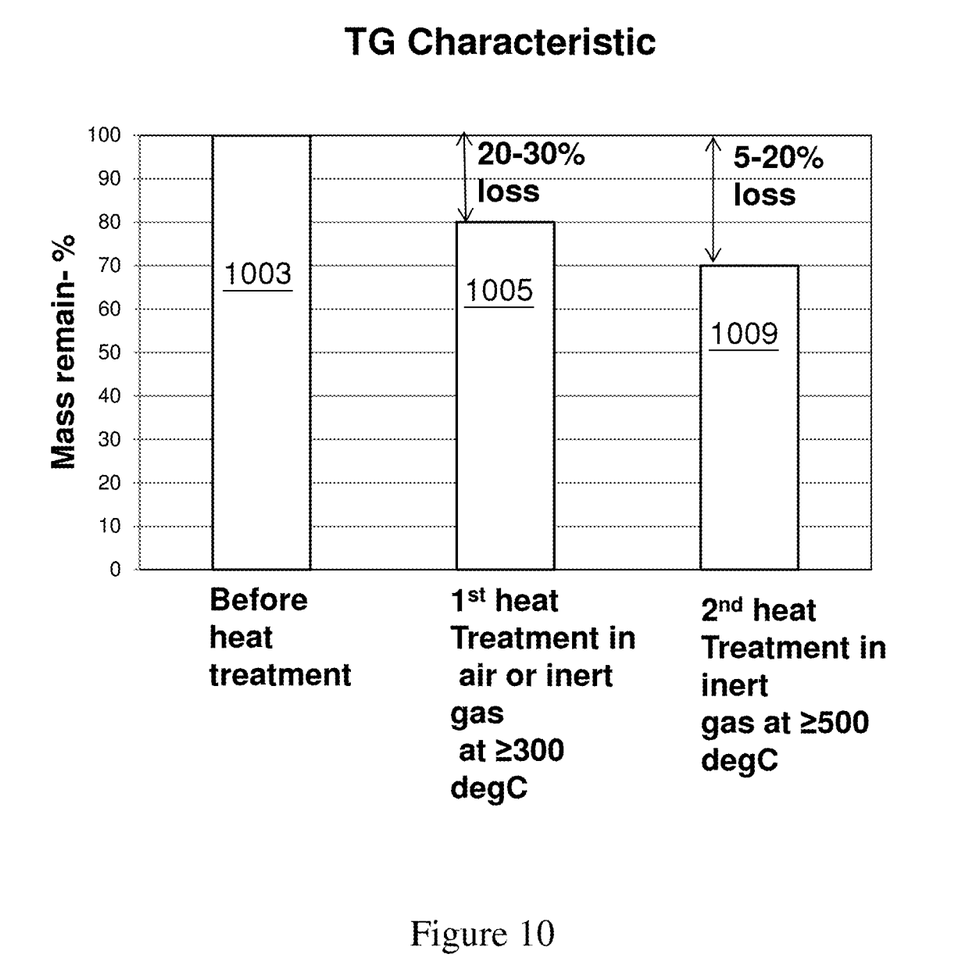
FIG. 10 illustrates heat conversions that take place in a solid deposit for forming the electrode composite material of FIG. 3.

FIG. 10 illustrates what happens to the mass of the dried solid deposit 413 in the two heating stages. The left-most bar 1003 shows the mass of the dried solid deposit 413 as 100% before heat treatment. In the first heating stage 1005 shows thermal reaction 1005 resulting in a loss of mass 1005, as show in the middle bar. The loss of mass implies that the surfactant 405 escapes from the solid deposit 801.

Furthermore thermal reaction 1009 is observed at the subsequent treatment at a higher temperature of >500° C. in an inert atmosphere. There is less loss of mass, as shown in the right-most bar 1011, which implies that a large part of the mass of the coagulant 410 remains inside the porous tin-based material as a carbonaceous material on the pores 303. FIG. 2 shows the pores 303 in tin-based material 301 produced using the process may even achieve a desirable minimum pore size of <1 μm.

The coagulant is preferably cationic and the surfactant anionic in order to ensure sufficient attraction between the coagulant and surfactant, although it is possible that the surfactant may be cationic while the coagulant is anionic in reverse. The preferred surfactant 405 in this embodiment is an anion surfactant such as polymeric sulfonates with methanal group or polycarboxylare. An example of a corresponding coagulant is a cationic polymer such as polyamine, polyamide, polyether, polyethylamide, polyethylenimine or polyaziridine or any hydrocarbon or polymer which contains a group such as ethylene.

The amount of coagulant 410 added to the mixture should, after carbonization, provide carbon content in the pores of the electrode composite material to between 5 to 20 wt % of the whole composite material.

Preferably, a thicker or denser layer of carbonaceous material 305 is formed in the deep end 307 of the pores 303 than at or about the mouths 308 of the pores 303. More preferably, the amount or the thickness of the carbonaceous material 305 on the walls of the pores 303 gradually decreases from inside the pores 303 towards the mouth of the pores 303. This is achieved by allowing a trace presence of oxygen in the generally inert atmosphere when carbonizing the coagulant 410, which provides opportunistic oxidation of carbon only at the mouth of the pores 303.

The oxygen should be in trace but sufficient amount only to oxidise the easily-reached carbonaceous material 305 at, around or about the mouth of the pores 303, but not carbonaceous material 305 inside the pores 303. This localised oxidation of carbonaceous material generates a larger mouth at the carbon laid pores and may also generate more pores on the composite material by unclogging any pore mouth which are clogged with the carbonaceous material.

Having less carbonaceous material 305 at the mouth of the pore and more carbonaceous material 305 deep inside the pores creates a greater affinity for lithium inside the pores 303. This provides and a sort of electrical gradient attracting lithium to move into and pack the deep end of the pores 303, maximizing use of the porosity of the tin-based material 301 to interact with lithium ions.

More preferably, only after it is deemed that the coagulant has completely carbonised in a completely inert atmosphere is the trace amount of oxygen introduced into the inert atmosphere. This prevents oxidation of the carbonaceous material 305 at the same time as the carbonaceous material 305 is forming in the pores 303, and allows better control of the amount of oxidation of the carbon at the mouth of the pores 303.

Figure 12:
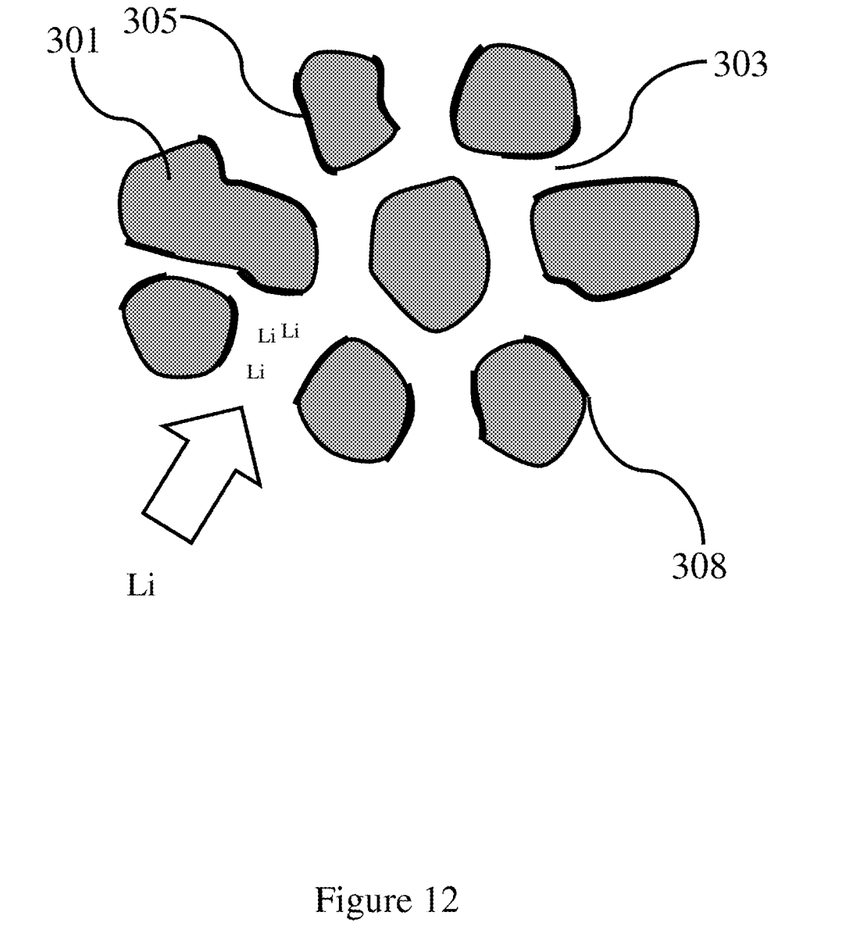
FIG. 12 illustrates a variation to the structure of the electrode composite material of FIG. 3.

FIG. 12 illustrates a possible variation of the embodiment to that of FIG. 3, wherein a higher amount of surfactant used causes formation of a pulverised, or a more fractured or fragmented tin-based matrix. Furthermore, a longer heating duration, higher trace oxygen content, and higher temperature range promote a pulverised form.

Figure 13:
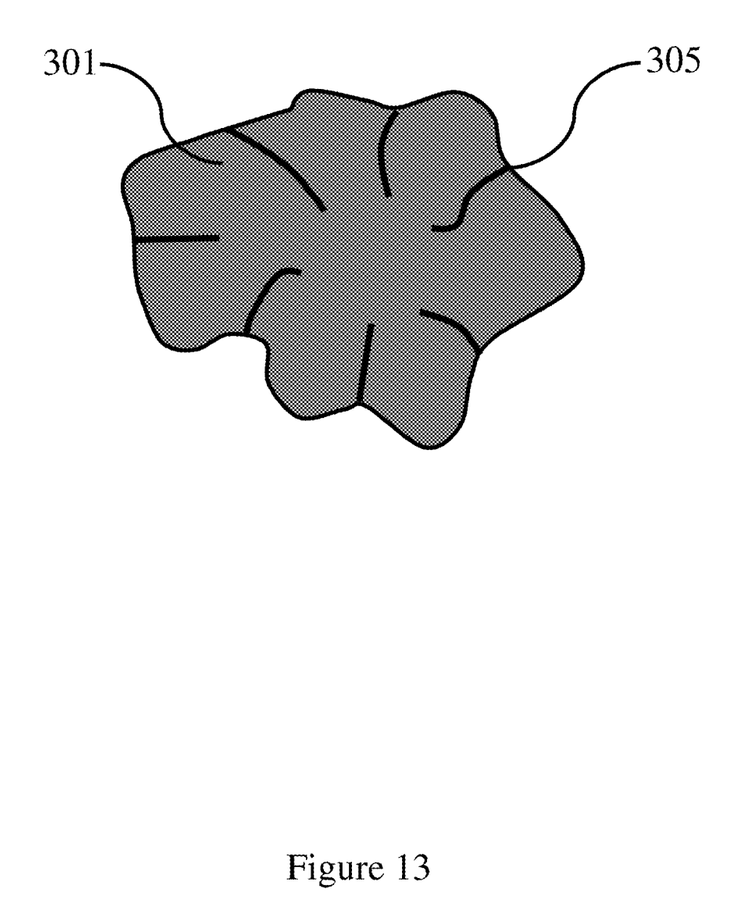
FIG. 13 illustrates a variation to the structure of the electrode composite material of FIG. 3.

FIG. 13 illustrates a further possible variation of the embodiment of FIG. 3, wherein a prolonged second heating stage causes the atoms in tin-based matrix to realign and close up to contain smaller, narrower or fewer pores.

As the skilled man would know, the product of the described embodiment is typically fine powder or granules, each particle being a tin-based material having pores laid with carbonaceous layer as described, which may be used for manufacture of electrodes in batteries.

It should be noted that too much phosphorus in tin-based material 301 may present opportunity for lithium to bind to the phosphorus permanently, which reduces available electrolyte. Preferably, the optimum range of phosphorus is <30 wt %, and may be as low as 5 wt % in some embodiments, and the percentage of tin>20 wt %, and is about 20-75 wt % in some embodiments. Therefore, in a variation of the embodiment, it is possible to include a step in the process to reduce the tin in the tin-based material 301 so that any tin(IV) to tin(II) or tin (0), such as, $SnP_2O_7$ to $Sn_2P_2O_7$ or SnP; and or SnO to Sn2O to Sn. For example, the carbonization of the coagulant 410 takes place in an atmosphere of reducing gas such as hydrogen or a hydrogen containing gas. Having less oxide in the tin-based material 301 reduces the chance of lithium attaching to oxide permanently. Care should be taken in this case to avoid introducing oxygen into a hydrogen atmosphere. Thus, if a hydrogen atmosphere is used to reduce tin, the step of oxidation of the carbonaceous material around the mouth of the pores should be conducted as a separate step, either before or after.

Optionally, the tin based material is precipitated in a reducing medium to encourage formation of tin (II) for higher tin to phosphorous ratio.

Exemplary embodiments of the present invention are described. Although the description referred to particular embodiments, it will be clear to one skilled in the art that the present invention may be practiced with variation of these specific details. Hence this invention should not be construed as limited to the embodiments set forth herein.

For example, the skilled man knows that the term 'pores' refers to any fissure, fault line or cavity formed deep in the body or at the surface of the electrode composite material suitable for the purpose of providing a structure for the alloying of lithium to the tin-based material in a lithium battery charging process, and for the formation of any amount and form of carbonaceous material 305 on the walls inside the pores. In some practices, the pores are be termed 'mesopores' and the composite structure is a meso-porous structure.

Furthermore, the skilled man understands that 'removing' the surfactant from the coagulated precipitate to form pores in the tin-based material may include vaporising the surfactant away, or any other method.

Although it is mentioned that the tin-based material comprises a generally Sn—P—O matrix, the skilled man understands that various other elements may be part of the matrix in practice, such as an amount of carbon inside the matrix leading to a general formula of Sn—P—O—C.

Furthermore, although the phosphorus precursor 403 is described as phosphorous acid, other forms of phosphorus may be used, such as soluble potassium phosphate salts and sodium phosphate salts, capable of ion exchange reaction with the selected tin salt.

Furthermore, the types of tin precursors 401 may include any solution of tin salts that has an anion replaceable with a phosphorus based ion or the phosphate in phosphorus acid, such as tin fluoride, tin chloride, tin sulphate, tin fluoride or tin nitrate. Some tin salts have limited solubility under specific conditions and it is within the knowledge of the skilled man to attend to these in practice.

The surfactant 405 may be any molecule that can form micelles with the tin-based material 301 to prevent agglomeration of the tin-based material 301, has the ability to bind to the coagulant 410, and to disperse the formation of pores 303 inside the tin-based material 301 as evenly and as isotropically as possible, and may be referred to in other embodiments as plasticizers, superplasticiziers, surfactants, poloxamers and so on.

Although it is mentioned that carbonaceous material 305 is formed on the wall inside the pores, the carbonaceous material 305 may be simply carbon or any short chain carbon material, as long as the material may be laid well on the pore wall and has better conductivity than the surface of the pore wall.

In a variation of the embodiment, the first and second heating stages 1005, 1009 may be combined as one heating stage to eliminate the surfactant 405 to form pores 303 and carbonised the coagulant 410 to form the carbonaceous later on the wall of the pore 305 at the same time. This will depend on the choice of the surfactant 405 and coagulant 410.

Although it has been described that the surfactant 405 is removed by heating in an atmosphere of air, it is possible that some choices of the surfactant 405 may allow the surfactant 405 to be vapourised by heating in an atmosphere of nitrogen, such as by evaporation or breaking of the surfactant without need of any oxidation in air.

Although the surfactant and coagulant in the coagulated precipitate have been described as preferably decomposable over a different temperature ranges, there could be overlapping temperature regions in practice. Therefore, some decomposition of coagulant may take place in the first heating stage and oxidised as gases when exposed to oxygen in air, thus released together with the evaporating surfactant, creating larger pores.

What is claimed is:

1. A method for producing a composite material for an electrode of a lithium ion battery comprising:
    precipitating a tin-based material in a presence of a surfactant to form a precipitate;
    adding a coagulant to coagulate the precipitate to form a deposit of the tin-based material mixed with the surfactant and the coagulant, the coagulant being a carbon-based material;
    removing the surfactant from the coagulated precipitate to form a first electro-conductive material having pores, the pores containing a decomposable substance; and
    decomposing the decomposable substance to form on walls of the pores a second electro-conductive material,
    wherein the second electro-conductive material has a higher conductivity than the first electro-conductive material.

2. The method of claim 1, wherein
the decomposable substance is a carbon-based material; and
the second electro-conductive material is a carbonaceous material.

3. The method of claim 1, wherein
the decomposable substance is decomposed in an inert gas atmosphere.

4. The method of claim 3, further comprising:
providing an amount of oxygen into the inert gas atmosphere.

5. The method of claim 2, further comprising:
oxidising the carbonaceous material at mouths of the pores.

6. The method of claim 1, wherein:
the tin-based material is precipitated from mixing a solution of tin precursor and a solution of phosphorous precursor.

7. The method of claim 1, wherein
the surfactant is anionic.

8. The method of claim 1, wherein
the coagulant is cationic.

9. The method of claim 1, wherein
the surfactant is polymeric sulfonates or polycarboxylate.

10. The method of claim 1, wherein
the surfactant is attached with a volatile group.

11. The method of claim 1, wherein
the coagulant is anyone of poly amine, polyamide, polyether, polyethylene, polyethylamine, polyethylenimine or polyaziridine.

* * * * *